US009009587B2

(12) United States Patent
Wilhelm et al.

(10) Patent No.: US 9,009,587 B2
(45) Date of Patent: Apr. 14, 2015

(54) BROWSER LOCKING TOOL TO CONTROL NAVIGATION AWAY FROM A CURRENT WEBPAGE TO A TARGET WEBPAGE

(75) Inventors: Robert Dale Wilhelm, Cheyenne, WY (US); Derek Ryan Brewer, Rochester, MN (US); Michael Bockus, Edmond, OK (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 13/400,458

(22) Filed: Feb. 20, 2012

(65) Prior Publication Data

US 2013/0219259 A1   Aug. 22, 2013

(51) Int. Cl.
*G06F 17/00* (2006.01)
*G06F 17/30* (2006.01)

(52) U.S. Cl.
CPC .............................. *G06F 17/30873* (2013.01)

(58) Field of Classification Search
CPC ............... G06F 2221/2149; G06F 2221/0706; G06F 17/30873; G06F 17/30902; G06F 9/468
USPC .................................................. 715/221, 234
See application file for complete search history.

(56) References Cited

U.S. PATENT DOCUMENTS

| | | | |
|---|---|---|---|
| 6,366,912 B1 * | 4/2002 | Wallent et al. | 715/234 |
| 7,185,238 B2 * | 2/2007 | Wedel et al. | 714/100 |
| 7,421,657 B1 | 9/2008 | Dawson-Granados | |
| 7,430,739 B2 | 9/2008 | Vellanki | |
| 7,440,997 B2 | 10/2008 | Colling | |
| 7,810,035 B2 | 10/2010 | Dominowska | |
| 2003/0009495 A1 * | 1/2003 | Adjaoute | 707/501.1 |
| 2004/0010710 A1 * | 1/2004 | Hsu et al. | 713/201 |
| 2005/0165729 A1 | 7/2005 | Gallagher | |
| 2006/0064469 A1 * | 3/2006 | Balasubrahmaniyan et al. | 709/218 |
| 2006/0129912 A1 * | 6/2006 | Kunori | 715/501.1 |
| 2010/0097324 A1 * | 4/2010 | Anson et al. | 345/173 |
| 2011/0173683 A1 * | 7/2011 | Roach | 726/4 |
| 2012/0137368 A1 * | 5/2012 | Vanstone et al. | 726/25 |

FOREIGN PATENT DOCUMENTS

WO    WO2006137950 A2    12/2006

OTHER PUBLICATIONS

Kim, Restrict Internet to one site, Mar. 1, 2006, Komando.com, pp. 1-6.*
Derek Melber, "Restricting Specific Web Sites in Internet Explorer Using Group Policy," Aug. 26, 2009, windowssecusity.com, pp. 1-5.*
Al-Farooque Shubho, "Work smarter not harder: 'navigate Away' feature for your ASP.NET/other web applications made easy," Dec. 14, 2010, codeproject.com, pp. 1-8.*

* cited by examiner

*Primary Examiner* — Kavita Padmanabhan
*Assistant Examiner* — Ariel Mercado
(74) *Attorney, Agent, or Firm* — Parashos Kalaitzis; Mark P Kahler

(57) ABSTRACT

A browser locking tool for an information handling system (IHS) may prevent data loss on a webpage. The browser locking tool may prevent navigation away from the webpage by both browser level navigation controls and webpage level navigation controls. Alternatively, the browser locking tool may allow navigation away from the webpage when the navigation should not cause data loss.

20 Claims, 9 Drawing Sheets

100

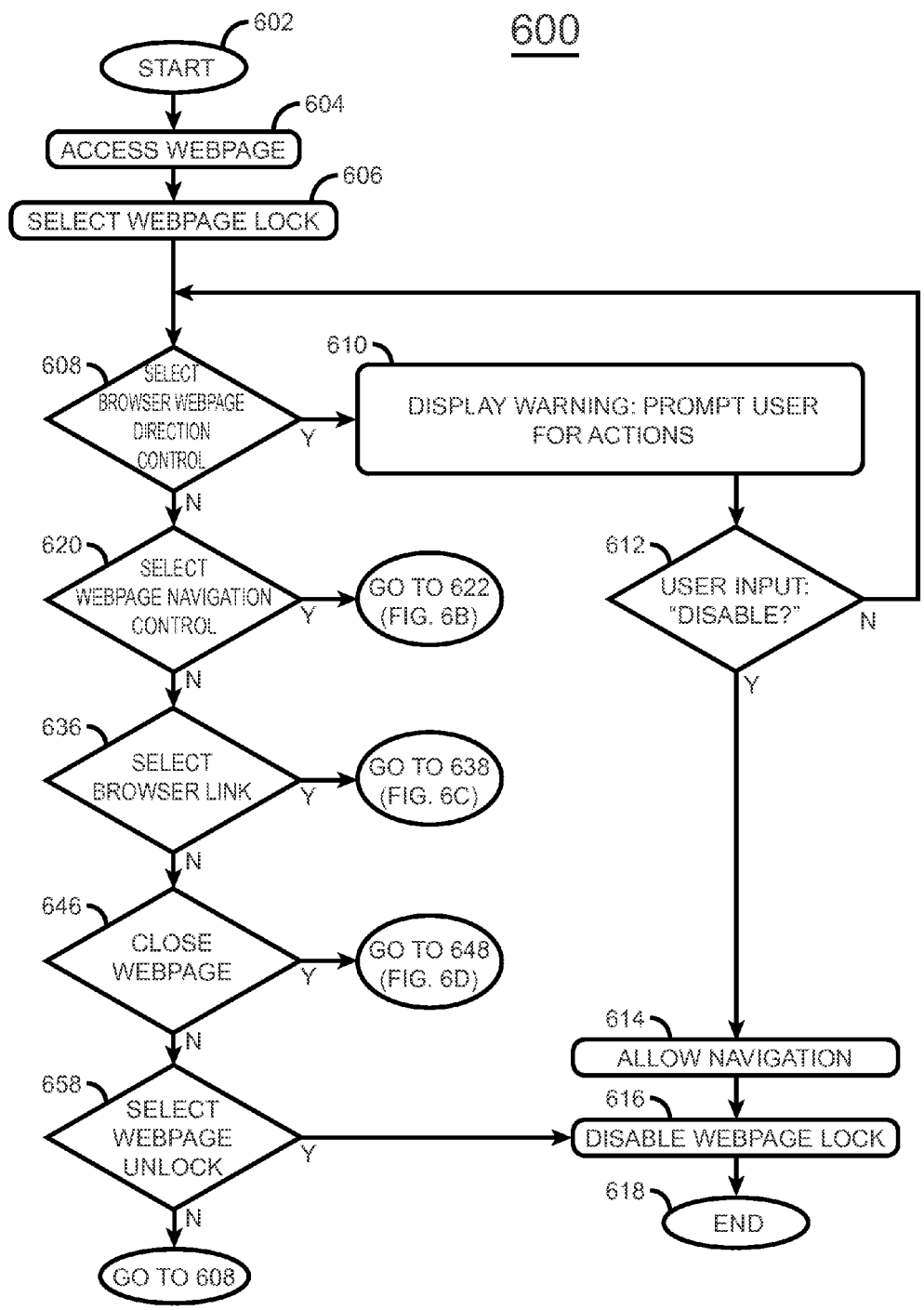

BROWSER LOCKING TOOL TO CONTROL NAVIGATION AWAY FROM A CURRENT WEBPAGE TO A TARGET WEBPAGE

BACKGROUND

The disclosures herein relate generally to information handling systems (IHSs), and more specifically, to browser navigation in information handling systems.

An information handling system (IHS) may include a browser that enables a user to navigate from page to page. A browser may be useful for both Internet and Intranet webpage navigation. Multiple webpages may share a common domain and may collectively form a website.

BRIEF SUMMARY

In one embodiment, a browser locking method is disclosed that includes receiving, by a browser of an information handling system (IHS), a request to display a particular webpage. The method also includes displaying, by the IHS, the particular webpage in response to receiving the request to display the particular webpage. The method further includes intercepting, by the browser of the IHS, a request to navigate away from the particular webpage to a target webpage. The method still further includes determining, by the browser of the IHS, whether to grant or block the request to navigate away from the particular webpage to the target webpage. The browser provides a block decision if navigating away from the particular webpage would cause loss of information of the particular webpage. Alternatively, the browser provides a grant decision if navigating away from the particular webpage would not cause loss of information of the particular webpage. The method also includes halting, by the browser, navigation away from the particular webpage in response to the block decision.

In another embodiment, an information handling system (IHS) is disclosed that includes a processor and a memory coupled to the processor. The memory stores a browser that is configured to receive a request to display a particular webpage. The browser is also configured to display the particular webpage in response to receiving the request to display the particular webpage. The browser is further configured to intercept a request to navigate away from the particular webpage to a target webpage. The browser is still further configured to determine whether to grant or block the request to navigate away from the particular webpage to the target webpage. The browser provides a block decision if navigating away from the particular webpage would cause loss of information of the particular webpage. Alternatively, the browser provides a grant decision if navigating away from the particular webpage would not cause loss of information of the particular webpage. The browser is also configured to halt navigation away from the particular webpage in response to the block decision.

In still another embodiment, a browser computer program product is disclosed that includes a computer readable storage medium. The browser includes first program instructions that receive a request for an information handling system (IHS) to display a particular webpage. The browser also includes second program instructions that instruct the IHS to display the particular webpage in response to receiving the request to display the particular webpage. The browser further includes third program instructions that intercept a request to navigate away from the particular webpage to a target webpage. The browser still further includes fourth program instructions that determine whether to grant or block the request to navigate away from the particular webpage to the target webpage. The fourth program instructions provide a block decision if navigating away from the particular webpage would cause loss of information of the particular webpage. Alternatively, the fourth program instructions provide a grant decision if navigating away from the particular webpage would not cause loss of information of the particular webpage. The browser also includes fifth program instructions that halt navigation away from the particular webpage in response to the block decision. The first, second, third, fourth and fifth program instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 6A-6D together form a flowchart that shows process flow in one embodiment of the disclosed browser locking methodology.

DETAILED DESCRIPTION

The disclosed information handling system (IHS) includes a browser with a locking tool that controls navigation away from a particular webpage such as a currently displayed webpage. The user selects a webpage lock in the locking tool to enable the locking feature of the locking tool. The locking tool monitors for, and intercepts, a request to navigate away from the particular webpage. The locking tool of the browser determines whether to grant or block a request to navigate away from the particular webpage. If navigation away from the particular webpage, such as the currently displayed webpage, will result in a loss of information, then the locking tool of the browser prevents or blocks navigation away from the particular webpage. However, if navigation away from the particular webpage will not result in a loss of information, then the locking tool of the browser does not prevent or block navigation away from the particular webpage.

In one embodiment, the locking tool intercepts requests, i.e. commands, to navigate away from the particular webpage including: browser webpage direction controls (e.g. forward, backward, refresh, home buttons), hyperlinks, bookmarks, hotkeys, and page close requests. The locking tool may be a built-in function of the browser or an add-on (e.g. plugin) to the browser.

Figure 1:
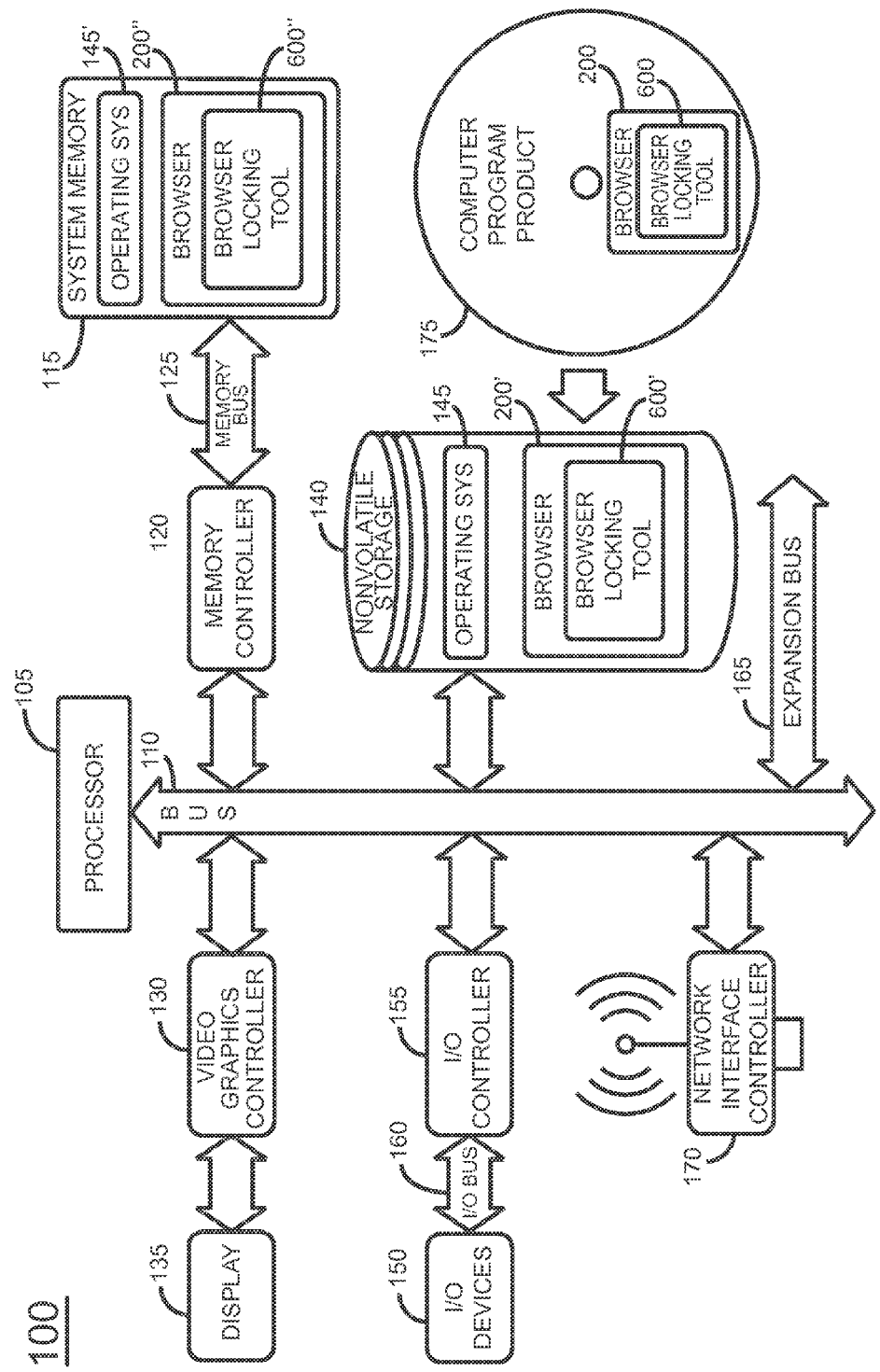
FIG. 1 is a block diagram of an information handling system (IHS) that employs the disclosed browser locking methodology.

FIG. 1 is a block diagram of an information handling system (IHS) 100 that employs the disclosed browser locking tool methodology to prevent undesired navigation away from a particular webpage. IHS 100 includes a processor 105 that may include multiple cores. IHS 100 processes, transfers, communicates, modifies, stores or otherwise handles information in digital form, analog form or other form. IHS 100 includes a bus 110 that couples processor 105 to memory 115 via a memory controller 120 and memory bus 125. System memory 115 may also be referred to as main memory. System memory 115 may be a static random access memory (SRAM) array or a dynamic random access memory (DRAM) array. Processor 105 may also include local memory such as L1, L2 and L3 caches. A video graphics controller 130 couples display 135 to bus 110. Nonvolatile storage 140, such as a hard disk drive, CD drive, DVD drive, or other nonvolatile storage couples to bus 110 to provide IHS 100 with permanent storage of information. System memory 115 and nonvolatile storage 140 are both forms of memory stores. Nonvolatile storage 140 stores an operating system 145 (OPERATING SYS) that governs operation of IHS 100. I/O devices 150, such as a keyboard and a pointing device, couple to bus 110 via I/O controller 155 and I/O bus 160.

One or more expansion busses 165, such as USB, IEEE 1394 bus, ATA, SATA, PCI, PCIE, DVI, HDMI and other busses, couple to bus 110 to facilitate the connection of peripherals and devices to IHS 100. A network interface controller 170 couples to bus 110 to enable IHS 100 to connect by wire or wirelessly to a network and other information handling systems. Network interface controller 170 may also be called a network communication adapter or a network adapter. While FIG. 1 shows one IHS that employs processor 105, the IHS may take many forms. For example, IHS 100 may take the form of a desktop, server, portable, laptop, notebook, tablet, or other form factor computer or data processing system. IHS 100 may take other form factors such as a gaming device, a personal digital assistant (PDA), a portable telephone device, a communication device or other devices that include a processor and memory.

IHS 100 includes a browser locking tool computer program product 600 on digital media 175 such as a CD, DVD or other media. For simplicity, the term browser locking tool will be used below. In one embodiment, browser locking tool 600 is within browser 200 as shown in FIG. 1. Browser locking tool 600 may also be an add-in that the user or other entity installs in IHS 100 at the user's convenience. In actual practice, IHS 100 may store browser 200 and browser locking tool 600 in nonvolatile storage 140 as browser 200' and browser locking tool 600'. IHS 100 may also store operating system 145 (OPERATING SYS) in nonvolatile storage 140. When IHS 100 initializes, the IHS loads operating system 145 into system memory 115 for execution as operating system 145'. IHS 100 also loads browser 200' and browser locking tool 600' into system memory 115 for execution as browser 200" and browser locking tool 600", respectively.

Figure 2:
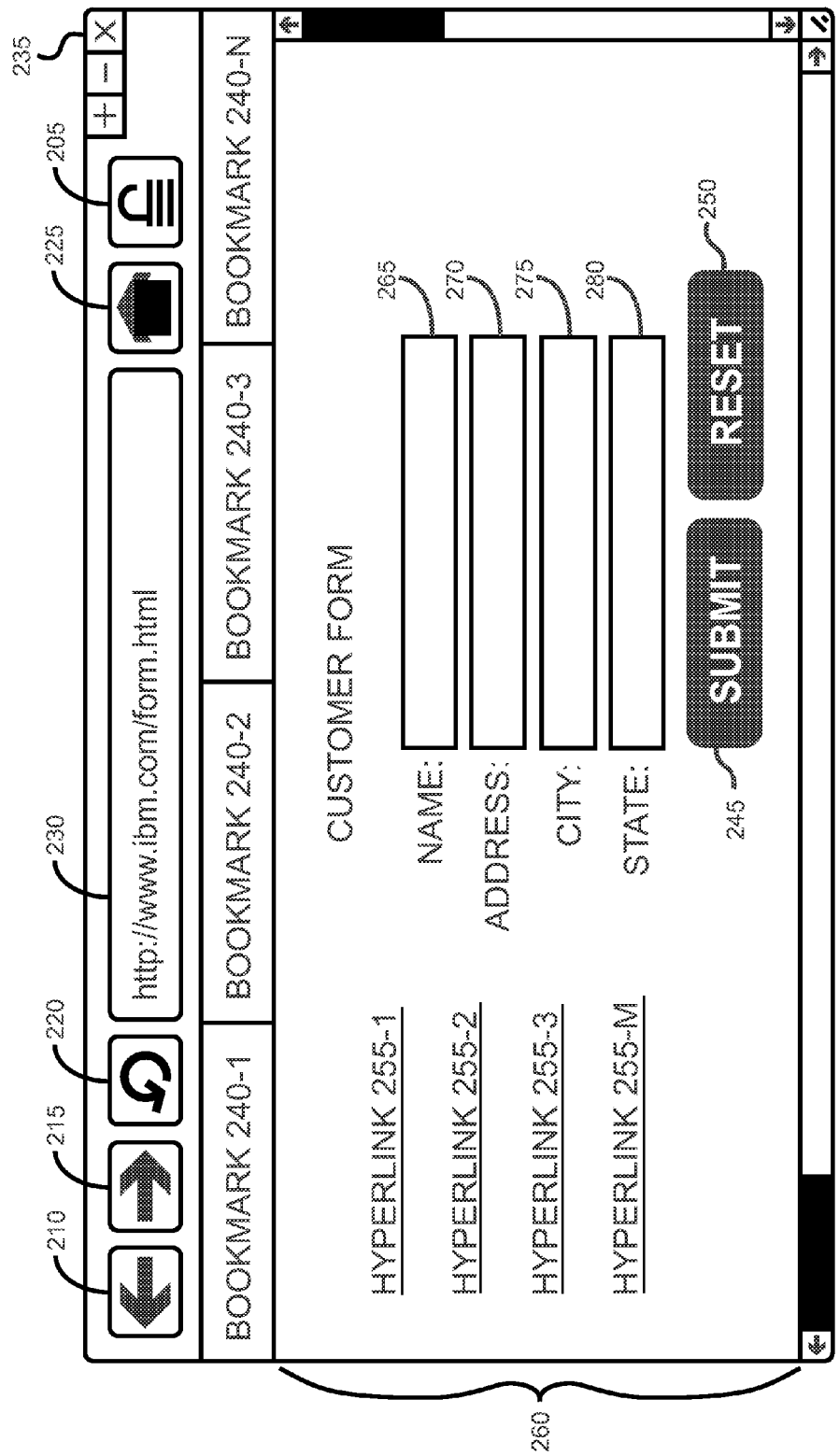
FIG. 2 is a representation of a browser window wherein the disclosed browser locking methodology is in a disabled state.

FIG. 2 shows the browser as browser window 200 that IHS 100 may display on display 135 when executing browser locking tool 600. More particularly, FIG. 2 illustrates a scenario wherein the browser locking tool 600 is disabled. To instruct browser locking tool 600 to assume the disabled state, the user or other entity selects lock button 205 using an I/O device 150, for example, a pointing device. When the user so selects lock button 205, the lock icon that represents lock button 205 changes from a closed lock (not shown in FIG. 2) to an open lock (as shown in FIG. 2).

Browser window 200 may display two types of navigation controls: browser level navigation controls and webpage level navigation controls. Browser level navigation controls control navigation globally at the browser level, namely for the entire browser. For example, browser level navigation controls may include a backward button 210, forward button 215, refresh button 220, home button 225, uniform resource locator (URL) field 230, browser window close button 235, bookmark 240-1, bookmark 240-2, bookmark 240-3, . . . bookmark 240-N wherein N is the total number of bookmarks displayed. Webpage level navigation controls control navigation at the webpage level, namely within a webpage. For example, webpage level navigation controls may include form submit button 245, form reset button 250, hyperlink 255-1, hyperlink 255-2, hyperlink 255-3, . . . hyperlink 255-M wherein M is the total number of hyperlinks displayed. These three button types, namely "submit", "reset" and "hyperlink", correspond to webpage level navigation commands.

Browser window 200 may display a particular webpage 260 within browser window 200. URL field 230 displays the address of that particular webpage 260. The address of a particular webpage 260 may include a domain. In one embodiment, a particular webpage is part of a particular website if the domain is the same. In other words, if two webpages exhibit the same domain, then they are part of the same website. To instruct URL field 230 to navigate to another webpage, the user or other entity may select URL field 230 and input an address using an I/O device 150, such as a keyboard.

The user or other entity may navigate to multiple particular webpages. Browser 200 stores a list (not shown) of previously accessed webpages. Entries in the list of previously accessed webpages may exhibit temporal ordering with the most recently accessed webpage at the top of the list. To instruct backward button 210 to navigate down the list of previously accessed webpages, the user or other entity may select backward button 210. If the list of previously accessed webpages does not contain any entries below the current webpage, navigation does not occur. To instruct forward button 215 to navigate up the list of previously accessed webpages, the user or other entity may select forward button 215. If the list of previously accessed webpages does not contain any entries above the current webpage, navigation does not occur. To instruct refresh button 220 to reload the current webpage, the user or other entity may select refresh button 220. If the user or other entity utilizes any navigation control other than backward button 210, forward button 215, or refresh button 220, all entries stored above the current webpage entry in the list of previously accessed webpages are lost. The browser navigates to the webpage and appends the now current webpage to the top of the list of previously accessed webpages. For example, if the user or other entity clicks backward button 210, there will be one webpage above the current webpage in the list of previously accessed webpages. If the user or other entity navigates to a new webpage by selecting URL field 230 and entering an address into URL field 230, the webpage to which the user or entity could have previously navigated by selecting forward button 215 has been removed from the list. After navigation, the browser displays the current webpage to which the user or entity navigated using URL field 230. The browser 200 appends the now current webpage to the top of the list of previously accessed webpages. The original webpage with which the user or entity started in this example is now lost. Refreshing a particular webpage such as the currently displayed webpage is a form of navigating away from the particular web page, because such refreshing may result in displaying an altered web page that is not the same as the particular web page. In other words, information may be lost when such refreshing occurs.

The browser 200 may store the address of a home webpage as set by the user or other entity. To instruct the home button 225 to navigate to the home webpage, the user or other entity selects home button 225. The browser 200 may store the addresses of webpage that a user or other entity selects as bookmark 240-1, bookmark 240-2, bookmark 240-3, . . . bookmark 240-N wherein N is the total number of bookmarks. To instruct bookmark 240-1, bookmark 240-2, bookmark 240-3, . . . bookmark 240-N, wherein N is the total number of bookmarks, to navigate to a particular webpage, the user or other entity selects bookmark 240-1, bookmark 240-2, bookmark 240-3, . . . bookmark 240-N, respectively.

To instruct browser window close button 235 to close browser window 200, the user or other entity selects browser window close button 235. The browser may lose information when the browser closes. The user or other entity may select any control or function described herein by the use of a hotkey.

A particular webpage 260, such as a currently displayed webpage, may include hyperlinks to navigate to other webpages. Hyperlinks may take the form of any element in a webpage. In one embodiment, hyperlink 255-1 could be text. In another embodiment, hyperlink 255-2 could be an image. To instruct hyperlink 255-1, hyperlink 255-2, hyperlink 255-3, . . . hyperlink 255-M, wherein M is the total number of hyperlinks, to navigate to a particular webpage, a user or other entity selects hyperlink 255-1, hyperlink 255-2, hyperlink 255-3, . . . hyperlink 255-M, respectively, wherein M is the total number of hyperlinks.

A particular webpage 260, namely a currently displayed webpage, within browser window 200 may include form elements. To instruct form submit button 245 to submit form information and navigate to a webpage, the user or entity selects form submit button 245. To instruct form reset button 250 to clear form information and navigate back to the currently displayed webpage, the user or entity selects form reset button 250. A particular webpage 260 may include a customer form. The customer form may include a form name field 265, form address field 270, form city field 275, and form state field 280. The user or other entity may input name, address, city, and state text data to each field, respectively. The blank form name field 265, form address field 270, form city field 275, and form state field 280 in FIG. 2 represent a form after a loss of data. In addition to form information that may be lost, other information such as session information or still other information that may be hidden from the user, may also be lost when the user navigates away from the currently displayed webpage to a target webpage.

Figure 3:
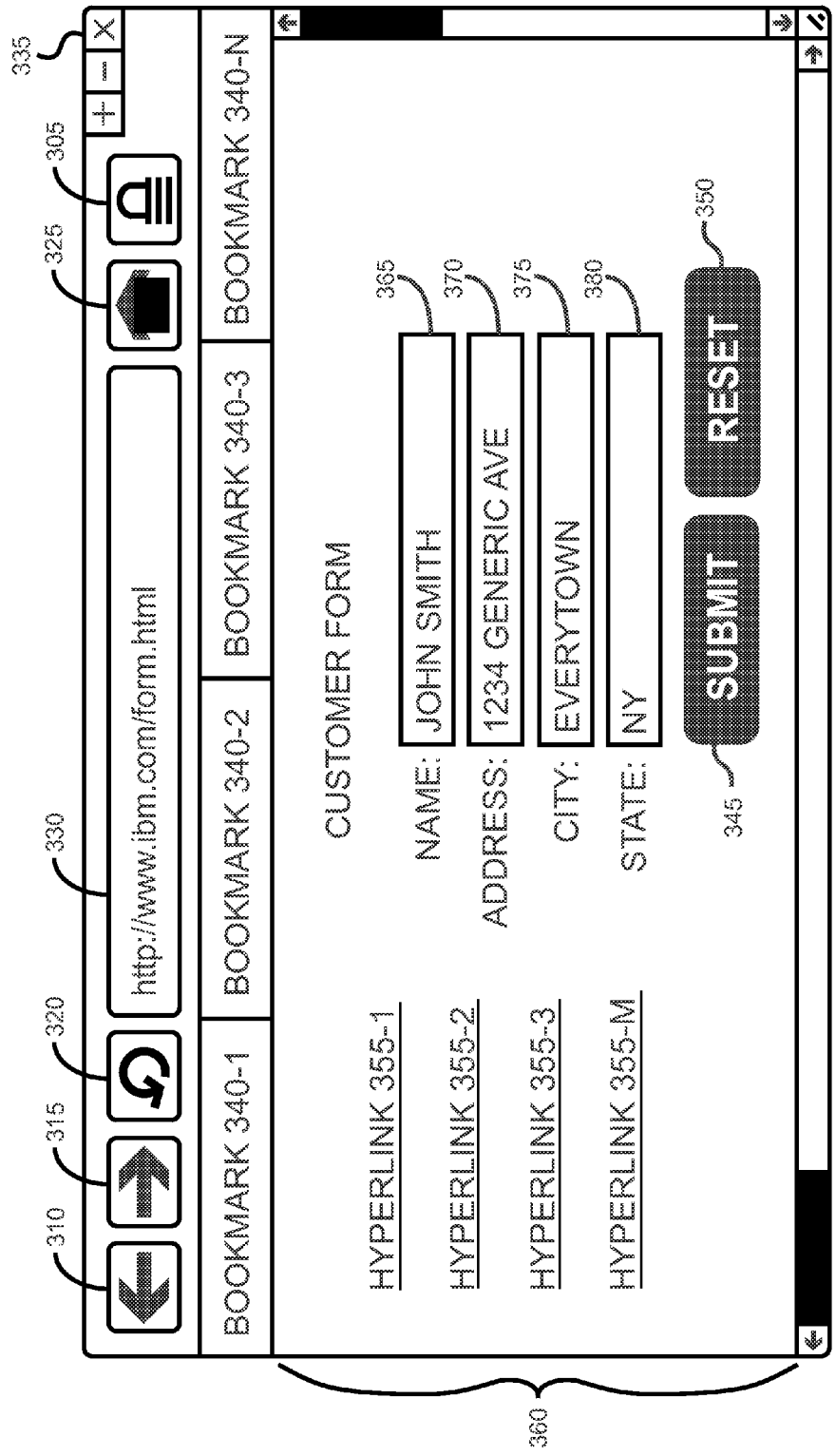
FIG. 3 is a representation of a browser window wherein the disclosed browser locking methodology is in an enabled state.

FIG. 3 includes many elements in common with FIG. 2. When comparing FIG. 3 with FIG. 2, like numbers indicate like elements. FIG. 3 illustrates a scenario wherein the browser locking tool 600 of browser 200 is enabled. To instruct browser locking tool 600 to assume the enabled state, the user or other entity selects lock button 305. When the user so selects lock button 305, the lock icon that represents lock button 305 changes from an open lock (not shown in FIG. 3) to a closed lock (as shown in FIG. 3).

A particular webpage 360 within browser window 300 may include form elements. The customer form may include a form name field 365, form address field 370, form city field 375, and form state field 380. The user or other entity may input form information such as name, address, city, and state text data to each field, respectively. The form name field 365, form address field 370, form city field 375, and form state field 380 represent a form after the user or other entity provides form information to the form fields. In one embodiment, the browser locking tool 600 prevents navigation away from a particular webpage by default settings, i.e. user preferences. User preferences may define, for example, that the form submit button 345 and form refresh button 350 may not prevent navigation. In another embodiment, the browser locking tool 600 prevents navigation away from a particular webpage unless the user or other entity selects a webpage level navigation control by default settings, i.e. user preferences. In yet another embodiment, the browser locking tool 600 prevents navigation away from a particular webpage and in so doing generates a dialog box prompting the user or other entity with a warning and option to proceed, as described in more detail below. The browser locking tool 600 may employ some or all of the described proposed embodiments of the browser locking tool 600 on a per website or per webpage basis as configured by the user or other entity in the user preferences. In contrast, if the user or other entity does not enable the browser locking tool 600 by selection or default, the form data as described above, as well as other webpage data, may be lost.

Figure 4:
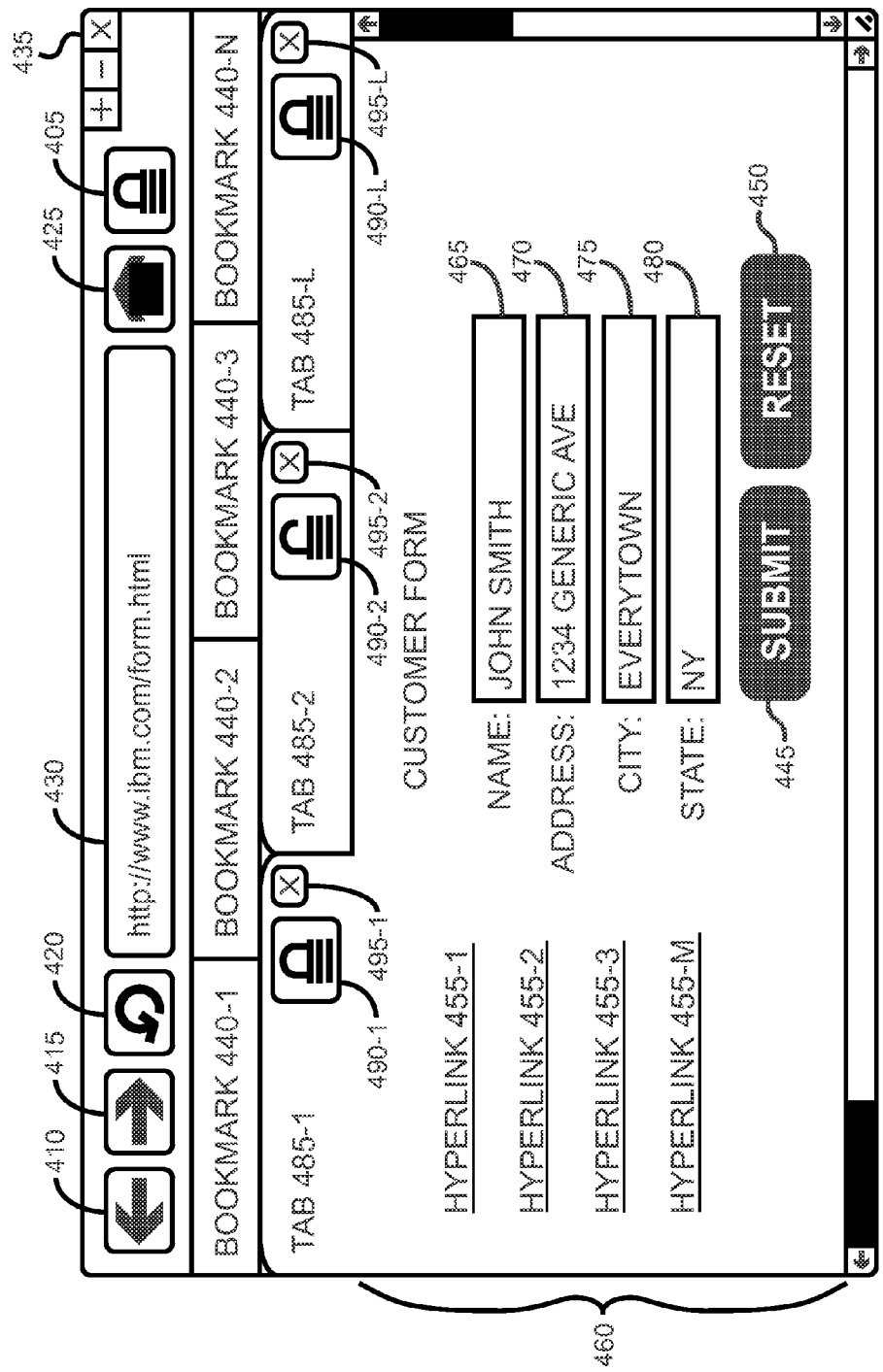
FIG. 4 is a representation of a browser window with multiple tabs wherein the disclosed browser locking methodology is in both enabled and disabled states.

FIG. 4 includes many elements in common with FIG. 3. When comparing FIG. 4 with FIG. 3, like numbers indicate like elements. FIG. 4 illustrates a scenario wherein the browser locking tool 600 is enabled. To instruct browser locking tool 600 to assume the enabled state, the user or other entity selects lock button 405. When the user so selects lock button 405, the lock icon that represents lock button 405 changes from an open lock (not shown in FIG. 4) to a closed lock (as shown in FIG. 4). The user or other entity may create a tab 485-1, tab 485-2, . . . tab 485-L where L is the number of tabs that the user creates. When a user or other entity selects one of tab 485-1, tab 485-2, . . . tab 485-L, the browser 200 in response may display a particular respective webpage 460. As shown in FIG. 4, tab 485-1 is the active tab. The particular webpage 460 and URL field 430 display the webpage and address associated with active tab 485-1, respectively. Browser window 400 does not display the webpage and address associated with tab 485-2, . . . tab 485-L, because the those tabs are not the active tab, i.e. not the currently selected tab.

Lock button 490-1, lock button 490-2, . . . lock button 490-L, function similarly to lock button 405, but instead provide locking on a tab by tab basis for tab 485-1, tab 485-2, . . . tab 485-L, instead of the locking the entire browser window 400. In other words, in one embodiment, the state of lock button 490-1 only applies to tab 485-1. In one embodiment, when the user or other entity creates tab 485-1, tab 485-2, . . . tab 485-L, then lock button 490-1, lock button 490-2, . . . lock button 490-L inherit their respective states from the current state of lock button 405. For example, when the user or other entity creates tab 485-1, the browser sets lock button 490-1 to the locked state because lock button 405 is set to the locked state. The user or entity may change the state of any lock button by selecting the respective lock button. When the user or other entity selects lock button 490-2, the lock icon that represents lock button 490-2 changes from a closed lock (not shown in FIG. 4) to an open lock (as shown in FIG. 4). Depending on the state of the lock button 490-1, lock button 490-2, . . . lock button 490-L, browser locking tool 600 controls the locking of navigation via tab 485-1, tab 485-2, . . . tab 485-L, respectively, as described above for browser window 200 and browser window 300.

To instruct tab close button 495-1, tab close button 495-2, . . . tab close button 495-L to close tab 485-1, tab 485-2, . . . tab 485-L, where L is the number of tabs, respectively, the user or other entity selects tab close button 495-1, tab close button 495-2, . . . tab close button 495-L, respectively. A tab may lose information when the tab closes. If browser locking tool 600 controls tab 485-1, tab 485-2, . . . tab 485-L, browser locking tool 600 will handle tab 485-1, tab 485-2, . . . tab 485-L as described above for browser window 300. To instruct browser window close button 435 to close browser window 400, the user or other entity selects browser window close button 435.

If browser locking tool 600 does not control tab 485-1, tab 485-2, ... tab 485-L, then tab 485-1, tab 485-2, ... tab 485-L may lose information when browser window 400 closes, because tab 485-1, tab 485-2, ... tab 485-L will also close. However, If browser locking tool 600 controls tab 485-1, tab 485-2, ... tab 485-L, browser locking tool 600 will handle tab 485-1, tab 485-2, ... tab 485-L as described above for browser window 300. In other words, if any tab is locked, the browser will not close that tab.

Figure 5:
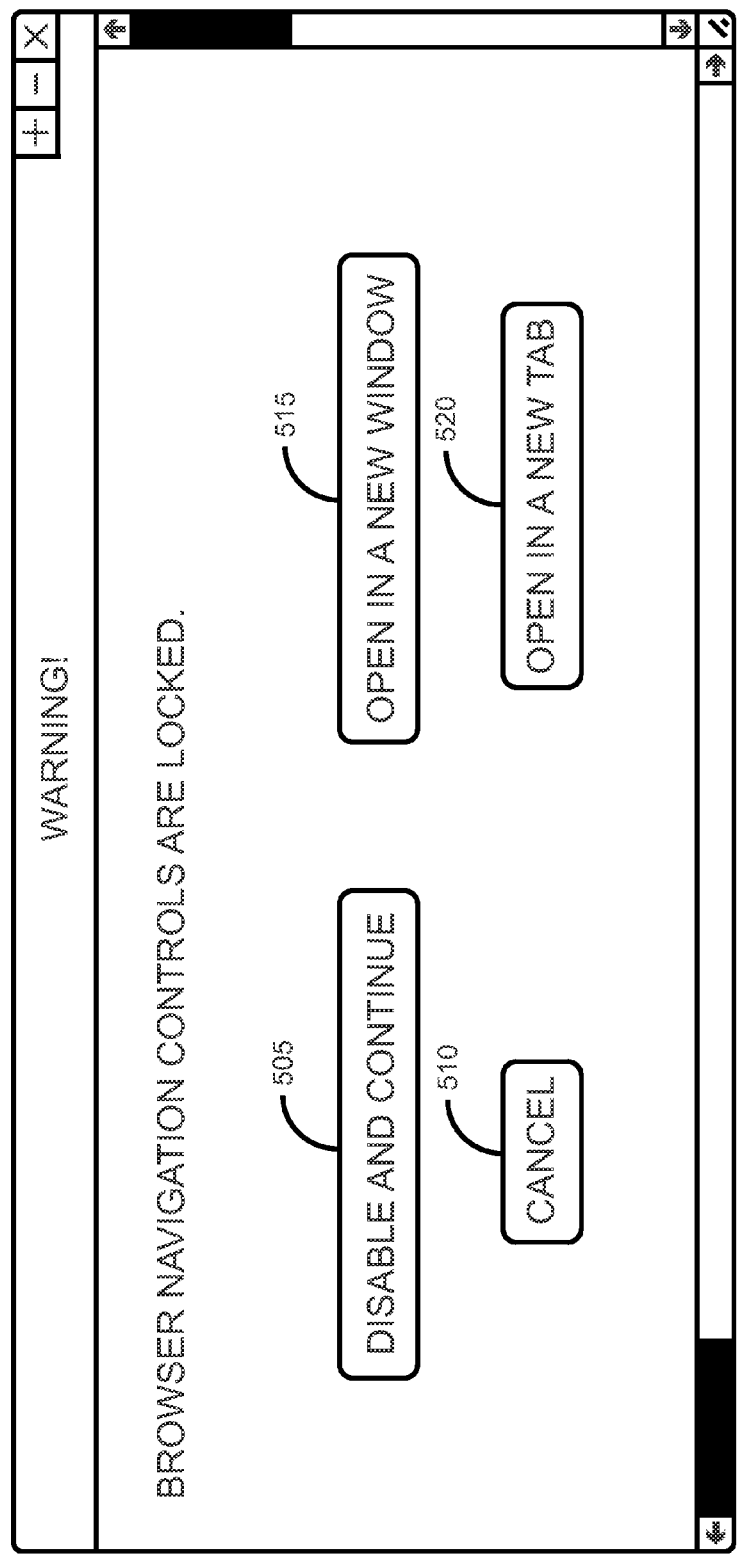
FIG. 5 is a representation of a warning dialog box generated in another embodiment of the disclosed browser locking methodology.

In one embodiment, the browser locking tool 600 may create a warning dialog box 500, as seen in FIG. 5. Browser locking tool 600 may cause display of the warning dialog box 500 when the current webpage is protected by the browser locking tool 600 and the current user or other entity attempts to navigate to another webpage. The warning dialog box 500 may present the user or other entity with several choices with respect to how to proceed when the user or other entity attempts to navigate to a webpage when the current webpage is in the locked state.

The user or entity may choose to select cancel button 510 to remove dialog box 500 and leave the current webpage unchanged. The user or entity may choose to select disable and continue button 505 to remove warning dialog box 500, to disable the browser locking tool 600 on the current webpage and navigate to the webpage that the attempted navigation request targets. The user or entity may choose to select "open in a new window" button 515 to remove dialog box 500 and open the attempted navigation request in a new browser window. The user or entity may choose to select "open in a new tab" button 520 to remove dialog box 500 and open the attempted navigation request in a new tab, in the same browser as the current webpage.

Figure 6B:
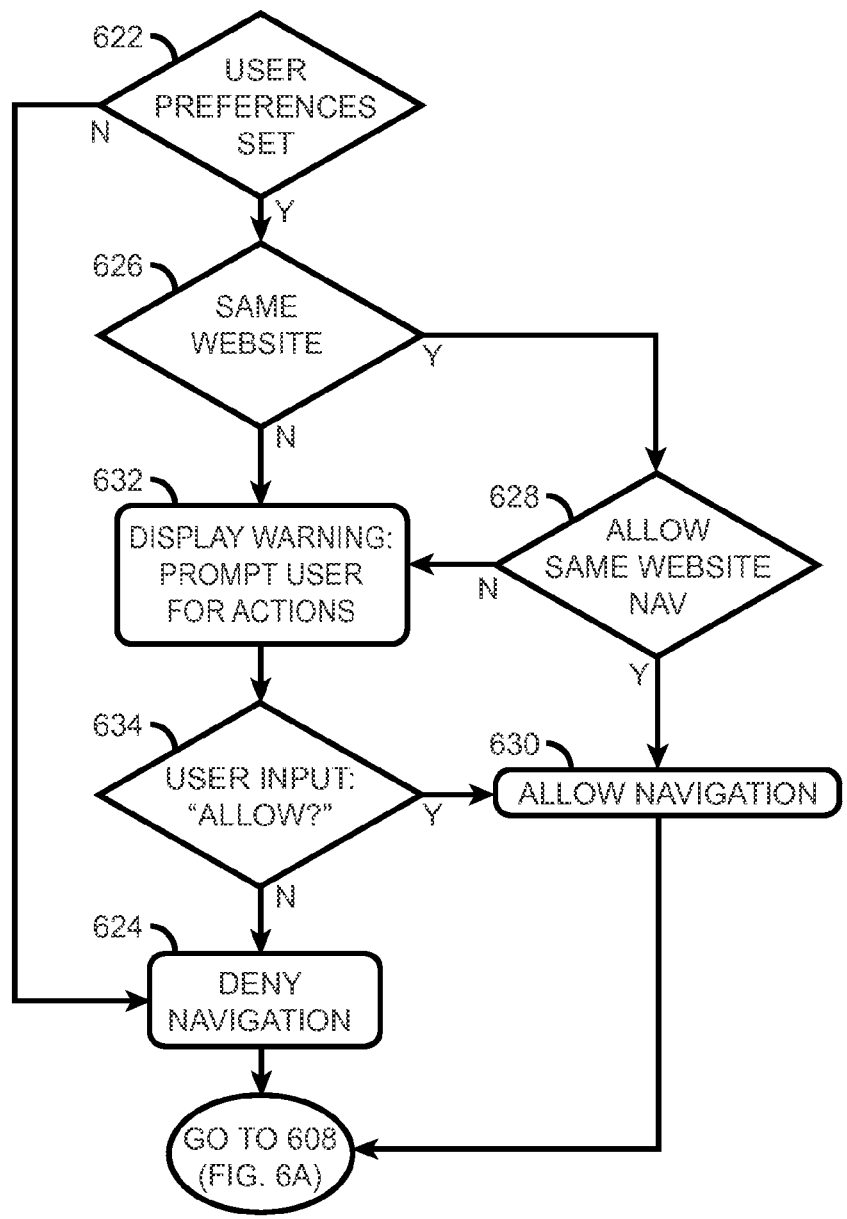

FIG. 6A is a flowchart that shows one embodiment of the disclosed browser locking tool method 600. Process flow begins when the user or other entity activates the browser, as per start block 602. The user or other entity may attempt to navigate to a target webpage that is different from the currently displayed webpage, as per block 604. The user or other entity may select to enable or disable the navigation blocking feature of browser locking tool 600 by toggling lock button 205, lock button 305, lock button 405. When employing browser tabs such as tab 485-1, tab 485-2, ... tab 485-L, the user or other entity may enable or disable the navigation blocking feature of such tabs by toggling, lock button 490-1, lock button 490-2, lock button 490-L, respectively, as per block 606.

Browser locking tool 600 performs a test to determine if the user selected browser webpage direction control, for example one of backward button 310, forward button 315 and refresh button 320, as per decision block 608. If browser locking tool 600 determines that the user selected a browser webpage direction control, then browser locking tool 600 intercepts the selection of the webpage direction control and displays a warning dialog box 500, as per block 610. Browser locking tool 600 determines if the user inputs a disable command in response to warning dialog box 500, as per decision block 612. If browser locking tool 600 determines that user did not input a disable command, then process flow continues back to decision block 608. However, if browser locking tool 600 determines that the user did input a disable command, then the browser locking tool 600 allows the browser to navigate to the target webpage, as per block 614. The browser locking tool 600 disables the navigation blocking feature of browser locking tool 600, as per block 616. Process flow ends at block 618 with the disabling of browser locking tool 600.

However, if browser locking tool 600 determines at decision block 608 determines that the user or other entity did not select a webpage browser direction control, then browser locking tool 600 performs a test to determine if the user selected a webpage level navigation control, as per block 620. If browser locking tool 600 determines that the user or other entity selects a webpage navigation control, the browser locking tool 600 checks to determine if user preferences are set, as per block 622 (in FIG. 6B). If user preferences are not set, i.e. default settings, the blocking feature of the browser locking tool 600 denies webpage navigation and process flow continues at block 608, as per block 624.

However, if decision block 622 determines that user preferences are set, i.e. not default settings, the browser locking tool tests to determine if the navigation request is to a target webpage that is part of the same website as the currently displayed webpage, as per block 626. If the browser locking tool 600 determines that the target webpage belongs to the same website as the currently displayed webpage, then browser locking tool 600 checks the user preferences to determine if the user or other entity specified if webpage navigation within the same website is allowed, as per block 628. If the user preferences allow same website navigation, then the browser locking tool 600 allows navigation to the target webpage and the process flow continues at block 608, as per block 630.

However, if decision block 626 determines that the target webpage is not in the same website as the currently displayed website, or if decision block 626 determines that the target webpage is in the same website as the currently displayed webpage and decision block 628 determines that the user preferences are not set to allow the browser locking tool 600 to navigate to webpages in the same website, then browser locking tool 600 may display a modified warning dialog box 500, as per block 632. The modified warning dialog box 500 may replace the disable and continue 505 button with a continue button. The continue button allows navigation to the target webpage away from the currently displayed webpage when the target webpage is in the same website, e.g. same domain, as the currently displayed website, but does not disable browser locking tool 600. The user or other entity may select to allow the blocking feature of browser locking tool 600 to temporarily allow navigation, as per block 634. If the user or other entity allows same website navigation, the browser locking tool 600 allows navigation to the target webpage, as per block 630, and process flow continues to block 608. However, if decision block 634 determines that the blocking feature of browser locking tool 600 may not navigate to the target webpage, then browser locking tool 600 does not navigate to the target webpage, as per block 624, and process flow continues at block 608.

Figure 6C:
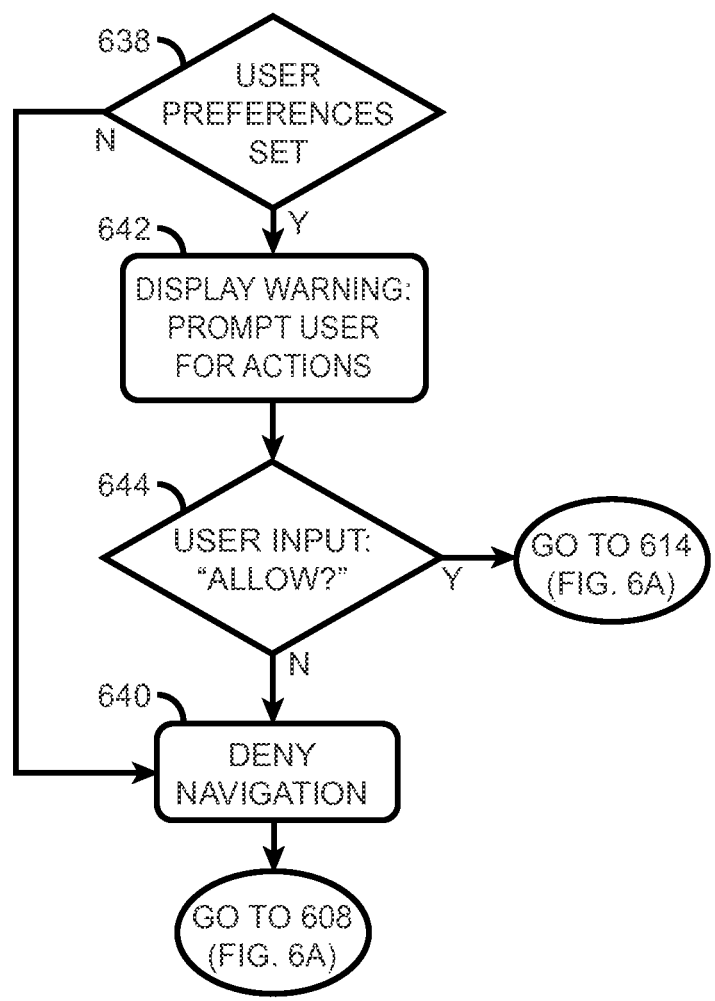

Returning to FIG. 6A, if decision block 608 determines that user or other entity did not select webpage browser direction control, and if decision block 620 determines that the user or other entity did not select a webpage navigation control, then browser locking tool 600 performs a test to determine if the user selected a browser link, such as home button 325, URL field 330, bookmark 340-1, bookmark 340-2, bookmark 340-3, ... bookmark 340-N where N is the total number of bookmarks, as per block 636. If browser locking tool 600 determines that the user or other entity selected a browser link, the browser locking tool 600 checks to determine if user preferences are set, as per block 638 of FIG. 6C. If user preferences are not set, i.e. default settings are not set, the blocking feature of the browser locking tool 600 denies webpage navigation, as per block 640 and process flow continues at block 608.

However, if decision block 638 determines that user preferences are set, i.e. not default settings, then browser locking tool 600 may display a warning dialog box 500, as per block 642. The user or other entity may select to allow the locking feature of browser locking tool 600 to allow navigation, as per block 644. If the user or other entity allows navigation, then browser locking tool 600 allows navigation to the target webpage, as per block 614 of FIG. 6A. The browser locking tool 600 disables the navigation locking feature of browser locking tool 600, as per block 616 of FIG. 6A. Process flow ends at block 618 with the disabling of browser locking tool 600. However, if decision block 644 of FIG. 6C determines that the locking feature of browser locking tool 600 may not navigate to the webpage, then browser locking tool 600 does not navigate to the target webpage and process flow continues at block 608, as per block 640.

If decision block 608 of FIG. 6A determines that the user or other entity did not select webpage browser direction control, and if decision block 620 determines that the user or other entity did not select a webpage navigation control, and if decision block 636 determines that the user or other entity did not select a browser link, then browser locking tool 600 performs a test to determine if the user selects a webpage close function, such as browser window close button 335, tab close button 495-1, tab close button 495-2, . . . tab close button 495-L where L is the number of tabs, as per block 646. If browser locking tool 600 determines that the user or other entity selects the webpage close function, then browser locking tool 600 checks to determine if user preferences are set, as per block 648 of FIG. 6D. If user preferences are not set, i.e. default settings, the blocking feature of the browser locking tool 600 denies webpage closure, as per block 650, and process flow continues at block 608 of FIG. 6A.

Figure 6D:
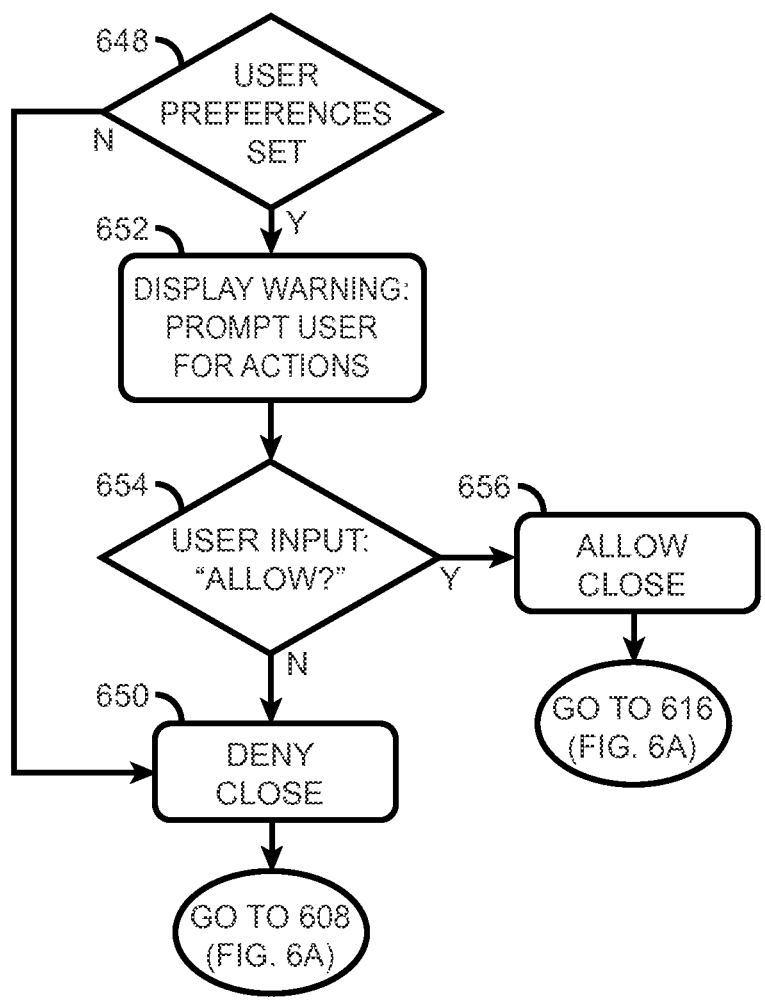

However, if decision block 648 of FIG. 6D determines that user preferences are set, i.e. the user preferences are not default settings, then browser locking tool 600 may display a modified warning dialog box 500, as per block 652. The modified warning dialog box 500 may replace the disable and continue 505 button with a close button. The close button allows the browser or tab to close the webpage. The browser locking tool 600 performs a test to determine if the user or other entity selects the option to allow the locking feature of the browser or tab to close the currently displayed webpage, as per decision block 654. If the user or other entity selects to allow the browser or tab to close the webpage, then browser locking tool 600 allows such closure, as per block 656, by disabling the navigation locking feature of browser locking tool 600, as per block 616. Process flow ends at block 618 of FIG. 6A with the disabling of browser locking tool 600. However, if decision block 654 of FIG. 6D determines that the locking feature of browser locking tool 600 may not close the webpage, then browser locking tool 600 does not close the webpage, as per block 650, and process flow continues at block 608.

If decision block 608 of FIG. 6A determines that user or other entity did not select webpage browser direction control, and if decision block 620 determines that the user or other entity did not select a webpage navigation control, and if decision block 636 determines that the user or other entity did not select a browser link, and if decision block 646 determines that the user or other entity did not close the webpage, then browser locking tool 600 performs a test to determine if the user selects to disable the blocking feature of browser locking tool 600, such as by selecting lock button 305, lock button 490-1, lock button 490-2, . . . lock button 490-L, as per block 658. If browser locking tool 600 determines at decision block 658 that the user or other entity does not select to disable the blocking feature of browser locking tool 600, then browser locking tool 600 does not unlock the webpage and process flow continues at block 608. However, if decision block 658 determines that the locking feature of browser locking tool 600 may be unlocked, then browser locking tool 600 disables the locking feature of browser locking tool 600, as per block 616. Process flow ends at block 618 with the disabling of browser locking tool 600.

As will be appreciated by one skilled in the art, aspects of the disclosed methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIGS. 6A-6D flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIGS. 6A-6D and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts of FIGS. 6A, 6B, 6C and 6D described above.

The flowcharts of FIGS. 6A, 6B, 6C and 6D illustrate the architecture, functionality, and operation of possible implementations of systems, methods and computer program products that perform network analysis in accordance with various embodiments of the present invention. In this regard, each block in the flowcharts of FIGS. 6A, 6B, 6C and 6D may represent a module, segment, or portion of code, which comprises one or more executable instructions for implementing the specified logical function(s). It should also be noted that, in some alternative implementations, the functions noted in the block may occur out of the order noted in FIGS. 6A, 6B, 6C and 6D. For example, two blocks shown in succession may, in fact, be executed substantially concurrently, or the blocks may sometimes be executed in the reverse order, depending upon the functionality involved. It will also be noted that each block of FIGS. 6A, 6B, 6C and 6D and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    receiving, by a browser of an information handling system (IHS), a user request to display a particular webpage of a particular website;
    displaying, by the IHS, the particular webpage in response to receiving the user request to display the particular webpage of the particular website;
    intercepting, by a locking tool for the browser of the IHS, a request to navigate away from the particular webpage to a target webpage to prevent data loss;
    determining, by the locking tool for browser of the IHS, whether to grant or block the request to navigate away from the particular webpage to the target webpage to prevent data loss,
        the locking tool for the browser of the IHS providing a block decision to prevent data loss if navigating away from the particular webpage to the target webpage would result in navigating away from the particular website, the locking tool for the browser of the IHS in response to the block decision prompting a user with a prompt including a plurality of options with respect to how to proceed, wherein the presented prompt includes a cancel option to remove the presented prompt and leave the current webpage unchanged, and wherein the presented prompt further includes options to proceed to the target webpage, wherein the options to proceed to navigate to the target webpage includes a continue option and a disable and continue option, wherein the continue option includes an open in a new window option and an open in a new tab option;
        the locking tool for the browser IHS providing a grant decision if navigating away from the particular webpage to the target webpage would not result in navigating away from the particular website;
    halting, by locking tool for the browser of the IHS, navigation away from the particular webpage in response to the block decision to prevent data loss, unless in response to the locking tool for the browser of the IHS prompting the user with the options to proceed to navigate to the target webpage, the user instructs the locking tool for the browser of the IHS to proceed to navigate to the target webpage by selecting the open in a new window option or the open in a new tab option; and
    halting, by the locking tool for the browser of the IHS, navigation away from the particular webpage in response to the block decision to prevent data loss, unless in response to the locking tool for the browser of the IHS prompting the user with the option to proceed to navigate to the target webpage, the user instructs the locking tool for the browser of the IHS to disable the locking tool for the browser of the IHS and to proceed to navigate to the target webpage by selecting the disable and continue option.

2. The method of claim 1, wherein the particular webpage is a currently displayed webpage and the request to navigate away from the particular webpage is a request to navigate to a target webpage other than the particular webpage.

3. The method of claim 1, further comprising:
    providing a form information to the particular web page, wherein the particular webpage is a currently displayed webpage.

4. The method of claim 1, further comprising:
   displaying, by the IHS, the target webpage in response to a grant decision; and
   continuing to display, by the IHS, the particular webpage in response to a block decision.

5. The method of claim 1, wherein the request to navigate away from the particular webpage to the target webpage is a browser level command.

6. The method of claim 5, wherein the browser level command comprises one of a forward command, backward command, home command, uniform resource locator (URL) command, browser window close command, and bookmark command.

7. The method of claim 1, wherein the request to navigate away from the particular webpage to a target webpage is a webpage level command.

8. The method of claim 7, wherein the webpage level command comprises one of a submit command, reset command, and hyperlink command.

9. The method of claim 1, wherein the open in a new window option or open in a new tab option may temporarily allow navigation without disabling the locking tool for the browser of the IHS.

10. The method of claim 1, further comprising:
    selecting an enabled or a disabled navigation blocking state for the browser of the IHS by the user.

11. The method of claim 10, wherein the receiving by a browser of an information handling system (IHS), a user request to display a particular webpage of a particular website, wherein the user request includes a request to display the particular webpage of the particular website in a tab of a plurality of tabs inherits the enabled or the disabled blocking state from the IHS.

12. An information handling system (IHS), comprising:
    a processor:
    a memory, coupled to the processor, the memory including a browser that is configured to:
    receive a user request to display a particular webpage of a particular website;
    display the particular webpage in response to receiving the user request to display the particular webpage of the particular website;
    intercept, by a locking tool for the browser of the IHS, a request to navigate away from the particular webpage to a target webpage to prevent data loss;
    determine, by the locking tool for browser of the IHS, whether to grant or block the request to navigate away from the particular webpage to the target webpage to prevent data loss,
    wherein the locking tool for the browser of the IHS providing a block decision to prevent data loss if navigating away from the particular webpage to the target webpage would result in navigating away from the particular website, the locking tool for the browser of the IHS in response to the block decision prompting a user with a prompt including a plurality of options with respect to how to proceed, wherein the presented prompt includes a cancel option to remove the presented prompt and leave the current webpage unchanged, and wherein the presented prompt further includes options to proceed to the target webpage, wherein the options to proceed to navigate to the target webpage includes a continue option and a disable and continue option, wherein the continue option includes an open in a new window option and an open in a new tab option;
    wherein the locking tool for the browser IHS providing a grant decision if navigating away from the particular webpage to the target webpage would not result in navigating away from the particular website;
    halt, by locking tool for the browser of the IHS, navigation away from the particular webpage in response to the block decision to prevent data loss, unless in response to the locking tool for the browser of the IHS prompting the user with the options to proceed to navigate to the target webpage, the user instructs the locking tool for the browser of the IHS to proceed to navigate to the target webpage by selecting the open in a new window option or the open in a new tab option; and
    halt, by the locking tool for the browser of the IHS, navigation away from the particular webpage in response to the block decision to prevent data loss, unless in response to the locking tool for the browser of the IHS prompting the user with the option to proceed to navigate to the target webpage, the user instructs the locking tool for the browser of the IHS to disable the locking tool for the browser of the IHS and to proceed to navigate to the target webpage by selecting the disable and continue option.

13. The IHS of claim 12, wherein the particular webpage is a currently displayed webpage and the request to navigate away from the particular webpage is a request to navigate to a target webpage other than the particular webpage.

14. The IHS of claim 12, wherein the browser is further configured to provide a form information to the particular webpage, the particular webpage being a currently displayed webpage.

15. The IHS of claim 12, wherein the browser is further configured to instruct the IHS to display the target webpage in response to a grant decision, and to continue to display the particular webpage in response to a block decision.

16. The IHS of claim 12, wherein the request to navigate away from the particular webpage to the target webpage is a browser level command.

17. The IHS of claim 16, wherein the browser level command comprises one of a forward command, backward command, home command, uniform resource locator (URL) command, browser window close command, and bookmark command.

18. The IHS of claim 12, wherein the request to navigate away from the particular webpage to a target webpage is a webpage level command.

19. The IHS of claim 18, wherein the webpage level command comprises one of a submit command, reset command, and hyperlink command.

20. A browser computer program product that includes a locking tool, comprising:
    a non-transitory computer readable storage medium;
    first program instructions that receive a user request for an information handling system (IHS) to display a particular webpage of a particular website;
    second program instructions that instruct the IHS to display the particular webpage in response to receiving the user request to display the particular webpage of the particular website;
    third program instructions that intercept a request to navigate away from the particular webpage to a target webpage to prevent data loss;
    fourth program instructions that determine whether to grant or block the request to navigate away from the particular webpage to the target webpage to prevent data loss, wherein the locking tool for the browser of the IHS providing a block decision to prevent data loss if navigating away from the particular webpage to the target webpage would result in navigating away from the particular website, the locking tool for the browser of the IHS in response to the block decision prompting a user with a prompt including a plurality of options with respect to how to proceed, wherein the presented prompt includes a cancel option to remove the presented prompt and leave the current webpage unchanged, and wherein the presented prompt further includes options to proceed to the target webpage, wherein the options to proceed to navigate to the target webpage includes a continue option and a disable and continue option, wherein the continue option includes an open in a new window option and an open in a new tab option;

wherein the locking tool for the browser IHS providing a grant decision if navigating away from the particular webpage to the target webpage would not result in navigating away from the particular website;

fifth program instructions that halt navigation away from the particular webpage in response to the block decision to prevent data loss, unless in response to the locking tool for the browser of the IHS prompting the user with the options to proceed to navigate to the target webpage, the user instructs the locking tool for the browser of the IHS to proceed to navigate to the target webpage by selecting the open in a new window option or the open in a new tab option;

sixth program instructions that halt navigation away from the particular webpage in response to the block decision to prevent data loss, unless in response to the locking tool for the browser of the IHS prompting the user with the option to proceed to navigate to the target webpage, the user instructs the locking tool for the browser of the IHS to disable the locking tool for the browser of the IHS and to proceed to navigate to the target webpage by selecting the disable and continue option; and wherein the first, second, third, fourth, fifth and sixth program instructions are stored on the non-transitory computer readable storage medium.

\* \* \* \* \*